(No Model.)

G. SEYFANG.
BICYCLE.

No. 558,852. Patented Apr. 21, 1896.

Witnesses:

Inventor:
George Seyfang,
by Michael J. Stark & Sons,
Attorneys.

United States Patent Office.

GEORGE SEYFANG, OF BUFFALO, NEW YORK.

BICYCLE.

SPECIFICATION forming part of Letters Patent No. 558,852, dated April 21, 1896.

Original application filed August 24, 1895, Serial No. 560,357. Divided and this application filed January 13, 1896. Serial No. 575,272. (No model.) Patented in Canada October 21, 1895, No. 50,359.

*To all whom it may concern:*

Be it known that I, GEORGE SEYFANG, a citizen of the United States, residing at Buffalo, in the county of Erie and State of New York, have invented certain new and useful Improvements in Bicycles, (for which I have received Canadian Patent No. 50,359, dated October 21, 1895, upon an application filed by me in the Canadian Patent Office on the 2d day of October, 1895;) and I do hereby declare that the following description of my said invention, taken in connection with the accompanying sheet of drawings, forms a full, clear, and exact specification, which will enable others skilled in the art to which it appertains to make and use the same.

The object of the present invention is the production of an efficient, serviceable, and durable crank-hanger for bicycles. To accomplish this result I construct my improved crank-hanger as shown in the accompanying drawings, in which—

Figure 1:
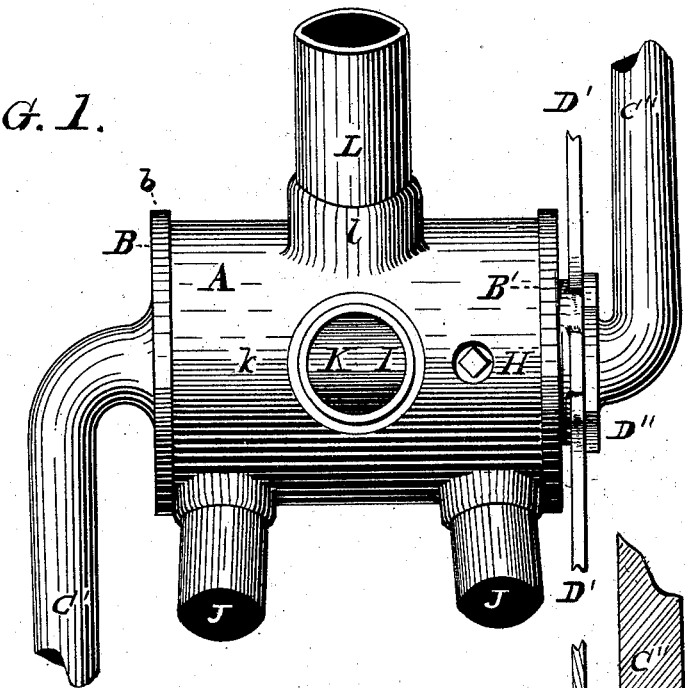
Figure 2:
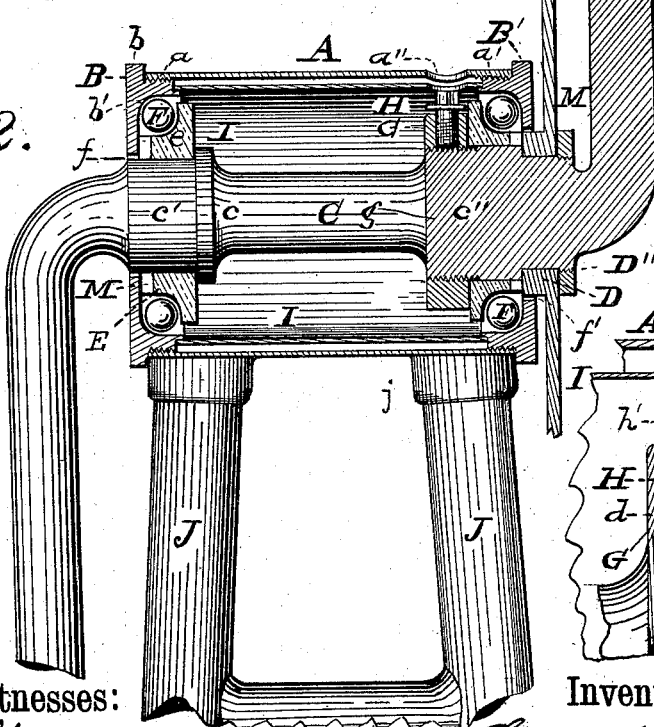
Figure 3:
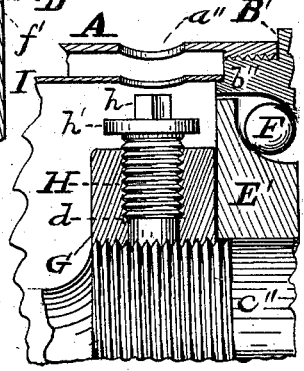

Figure 1 is a plan of the same, and Fig. 2 a sectional plan. Fig. 3 is a sectional view of a portion of said crank-hanger, drawn to an enlarged scale.

Like parts are designated by corresponding letters of reference in all the figures.

This invention consists, essentially, in the novel and peculiar combination of parts and details of construction, as will now be fully described, and then pointed out in the claims.

A in the drawings represents a cylindrical shell or barrel having both of its ends internally screw-threaded at $a$ to receive caps or casings B B', respectively, the screw-threads $a$ being oppositely disposed—*i. e.*, one being a right and the other a left hand thread. These casings are externally milled on their flanges $b$ to enable their being readily screwed into position, and they are provided with central apertures $f\ f'$ for the passage of the crank-shaft C. On their inner faces these casings are dished at $b'$ to form, in conjunction with the cones E having a curved periphery $e$, a raceway for the balls F, thus producing the so-called "ball-bearing." The casings as well as the cones are preferably made from tool-steel, properly hardened to avoid wear.

C is the crank-shaft, which is formed integral with the pedal-cranks C' C'', which latter stand opposite each other in the usual manner. This crank-shaft has at its left a swell or enlargement $c'$, upon which the cone E is affixed, and with a collar $c$, against which the said cone E bears. At the right this shaft C has a further swell or enlargement $c''$ to receive the cone E', fitting this enlargement $c''$, (a snug fit,) not so tightly, however, but that adjustment nut or collar G, fitting a screw-threaded portion $g$ of said enlargement $c''$, may move said cone upon said swell $c''$ whenever adjustment of the ball-bearing becomes desirable or necessary. Upon the swell $c''$ is furthermore secured the spider of the sprocket-wheel, consisting of the hub D and spokes D', said hub being fastened upon the shaft by a key and lock-nut D'' or in any other approved manner. In the collar or adjusting-nut G there is a set-screw H, having a collar $h'$, and above this collar a square section $h$, while in the bore for the set-screw is placed a plug $d$, upon which the set-screw bears to avoid injury to the screw-thread $g$.

In the barrel A there is an aperture $a'''$, through which a socket-wrench may be passed to manipulate the set-screw H, which latter is prevented from being entirely withdrawn from its nut by the collar $h'$ coming in contact with the inner periphery of a dust-cylinder I, placed upon shoulders $b''$ on the casings B B' (see Fig. 3) and thereby prevented from dropping into the barrel.

On the barrel A there are provided bosses $j\ j$, receiving the tubes J J passing to the rear wheel; also a boss $k$ for the seat-post tube K, and a further boss $l$ for the forward tube L, said tubes being brazed into the bosses in the usual manner.

It will now be observed that the central opening $f'$ in the casing B' is made large enough to fully pass the largest portion of the crank-shaft through it, while the barrel A is made of a length and diameter adapted to pass one of the pedal-cranks through it, after which the casings are screwed in position and final adjustment of the ball-bearing made by operating the adjusting-nut G in a manner already referred to.

By the construction as described I derive many advantages over others, chiefly among which are cheapness and durability. The crank-shaft and pedal-cranks being formed in one piece of forging are more substantial and less liable to get out of order than a crank-shaft having the pedal-cranks separately formed and attached, while at the same time the cost of production of the parts is lessened. The barrel being solid—that is to say, without any excisions or notches—is stronger than those in which the crank-shaft is inserted through a slot in said barrel.

To prevent dust from entering the ball-races, felt washers M are placed upon the crank-shaft, as clearly shown in Fig. 2.

In this present specification I have described a crank-hanger, a crank-shaft, two pedal-cranks, cones, and casings, said pedal cranks and shaft being formed integral and adapted to pass into and through the hanger from one end thereof. Although this device forms a part of my invention, I do not claim the same in this present application for the reason that it forms the subject-matter of the original application filed by me on the 24th day of August, 1895, Serial No. 560,357, of which this present application is a division; but,

Having thus fully described my invention, I claim as new and desire to secure to me by Letters Patent of the United States—

1. In a bicycle, the crank-hanger described consisting of a barrel having in both ends casings, the central bore of one of which is larger than the other, a crank-shaft having the pedal-cranks formed integral and provided with a swell, and collar, for one of the cones, and with a further enlargement for the opposite cone, and an adjusting screw-collar upon said last-mentioned swell and provided with a set-screw, said adjusting-collar being located within the barrel, and the whole constructed and combined in the manner as, and for the object set forth.

2. In a bicycle, the combination, with the barrel having on both ends removable casings, of a crank-shaft having cones, as described, and the adjusting-nut having the set-screw provided with a collar-and-wrench section, said barrel having an aperture for the passage of a socket-wrench, whereby said set-screw may be manipulated and prevented from falling out of the collar into the barrel, as set forth.

3. In a bicycle, the combination, with the barrel having the wrench-opening as described, of the crank-shaft, the enlarged screw-threaded swell on said shaft, a screw-threaded collar upon said swell, and a set-screw in said collar having a flange larger in diameter than the wrench-opening in said barrel, whereby said set-screw is prevented from being entirely withdrawn from said collar, when in position within the barrel, as specified.

In testimony that I claim the foregoing as my invention I have hereunto set my hand in the presence of two subscribing witnesses.

GEORGE SEYFANG.

Witnesses:
 KATHERINE ADEMA,
 WM. O. STARK.